US008239274B2

(12) United States Patent
Karki et al.

(10) Patent No.: US 8,239,274 B2
(45) Date of Patent: Aug. 7, 2012

(54) PURCHASING OF INDIVIDUAL FEATURES OF A SOFTWARE PRODUCT

(75) Inventors: Mukesh Karki, Bellevue, WA (US); Mohammed Zubair Ansari, Kirkland, WA (US); Yusuf Atas, Redmond, WA (US); Robert Ian Oliver, Issaquah, WA (US); Serdar Unal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1413 days.

(21) Appl. No.: 11/652,214

(22) Filed: Jan. 11, 2007

(65) Prior Publication Data

US 2008/0172300 A1 Jul. 17, 2008

(51) Int. Cl.
*G06Q 30/00* (2012.01)
(52) U.S. Cl. ............... 705/26.1; 705/26.5; 705/26.8; 705/26.81; 705/26.82
(58) Field of Classification Search ............... 705/26, 705/26.1–27.2
See application file for complete search history.

(56) References Cited

U.S. PATENT DOCUMENTS

| 6,182,275 | B1 | 1/2001 | Beelitz et al. |
| 6,195,432 | B1 | 2/2001 | Takahashi et al. |
| 6,243,692 | B1 | 6/2001 | Floyd et al. |
| 6,889,202 | B2 | 5/2005 | Johnson et al. |
| 7,046,997 | B2 | 5/2006 | Bahr |
| 7,050,923 | B2 | 5/2006 | Fuller, III et al. |
| 7,831,517 | B1 * | 11/2010 | Vijay et al. ............... 705/59 |
| 2004/0093593 | A1 | 5/2004 | Jhanwar et al. |
| 2004/0267590 | A1 | 12/2004 | Clark et al. |
| 2005/0108708 | A1 | 5/2005 | Im |
| 2005/0138619 | A1 | 6/2005 | Tsai |
| 2011/0238478 | A1 * | 9/2011 | Gottfurcht et al. ......... 705/14.25 |

FOREIGN PATENT DOCUMENTS

| KR | 1020020038323 A | 5/2002 |
| WO | WO2006003538 A1 | 1/2006 |
| WO | 2006033975 A2 | 3/2006 |

OTHER PUBLICATIONS

"70-SSA Seeking Sources for COTS Software Package(s)" Provided by Federal Information & News Dispatch, Inc., Commerce Business Daly. Washington: Jul. 23, 2001. p. 1. Retrieved via ProQuest on Jan. 17, 2012.*
"Exceed on Demand Overview", Date: Feb. 2005, http://www.onix-net.com/hummingbird/exceed_ondemand/eod5.pdf#search=%22-Exceed%20ondemand%20overview%22.

(Continued)

*Primary Examiner* — Michael Misiaszek
(74) *Attorney, Agent, or Firm* — Capitol City TechLaw; Richard C. Irving (57) ABSTRACT

In various embodiments, a user may, via a processing device, indicate a desire to purchase a feature of an installed software product. A purchase request may be sent to an e-commerce server, or other server. The purchase request may be validated and information concerning the software product, the feature of the software product, and the processing device may be stored. Enabling information may be sent to the processing device to enable the feature of the software product. In some embodiments, the user may request a trial of a feature of a software product before purchasing the feature. In other embodiments, the user may deactivate a purchased feature of a software product on one processing device and may activate the purchased feature of the software product on a different processing device.

14 Claims, 8 Drawing Sheets

OTHER PUBLICATIONS

"WinINSTALL Desktop Availability Suite (DAS)", http://www.ondemandsoftware.com/Das.asp.
Ramachandra, et al., "Hydra: a new approach for integrating various wireless environments", Date: Jun. 27-30, 2005, On pp. 961-968, http://ieeexplore.ieee.org/search/srchabstract.jsp?arnumber=1493-839&isnumber=32117&punumber=10000&k2dockey=1493839@ieeecnfs&query=%28+%28+%7E%7Eoperating+system%7E%E%3Cin%3Emetadata+%29+%3Cand%3E+%28+feature%3Cin%3E-metadata+%29+%29%3Cand%3E+%28+online+or+buy*+or+purchas*%3Cin%3Emetadata+%29&pos=.
"International Search Report", Mailed Jun. 24, 2008, Application No. PCT/US2008/050646, Filed Date Jan. 9, 2008, pp. 1-10.

* cited by examiner

PURCHASING OF INDIVIDUAL FEATURES OF A SOFTWARE PRODUCT

BACKGROUND

When an end user purchases a software product, such as an operating system or other software product, the user may select a specific version of the software product. For example, the user may select a Home version, a Professional version, or other version of the software product. Each version may have a specific set of features. If a user who has the Home version of the software product installed on his or her processing device wishes to use a feature that is only available with the Professional version of the software product, the user must upgrade the software product to the Professional version. Typically, when a user upgrades to another version of a software product, not only does the user get access to a feature of the software product that the user may wish to use, but the upgraded version of the software product may contain additional features which the user may never use. Thus, in order to upgrade the software product, the user must pay not only for features the user may desire to use, but for features that the user may never use.

After a user purchases and installs a software product on a processing device, the user may activate the software product on the processing device. Typically, activation involves providing information about the software product and the processing device, upon which it is installed, to a server, such as, for example, a product activation server. After providing the information about the software product and the processing device, features of the software product may be enabled for use on the processing device.

After installing and activating the software product, the user may decide, for one reason or another, that he or she wishes to use the software product on another processing device, instead of the processing device upon which the software product is installed and activated. Currently, there is no easy way to deactivate the software product installed on one processing device and to activate the software product on another processing device.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a user may have a processing device with an installed software product. The software product may have one or more features, which may be available for purchase. The user may indicate a desire to purchase a feature of the software product from the processing device. The processing device may send a purchase request to another processing device, such as, for example, an e-commerce server or other processing device, which may validate payment information. Information with respect to the software product, the feature of the software product, and the processing device on which the software product is installed may be sent from the processing device and stored in a database. Enabling information may be sent to the processing device to enable the purchased feature of the software product. In some embodiments, the user may request and receive a trial period during which the feature of the software product is temporarily enabled on the processing device. In other embodiments, a user may deactivate or disable a purchased software feature from one processing device and may activate or enable the purchased software feature on another processing device.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Exemplary Operating Environment

Figure 1:
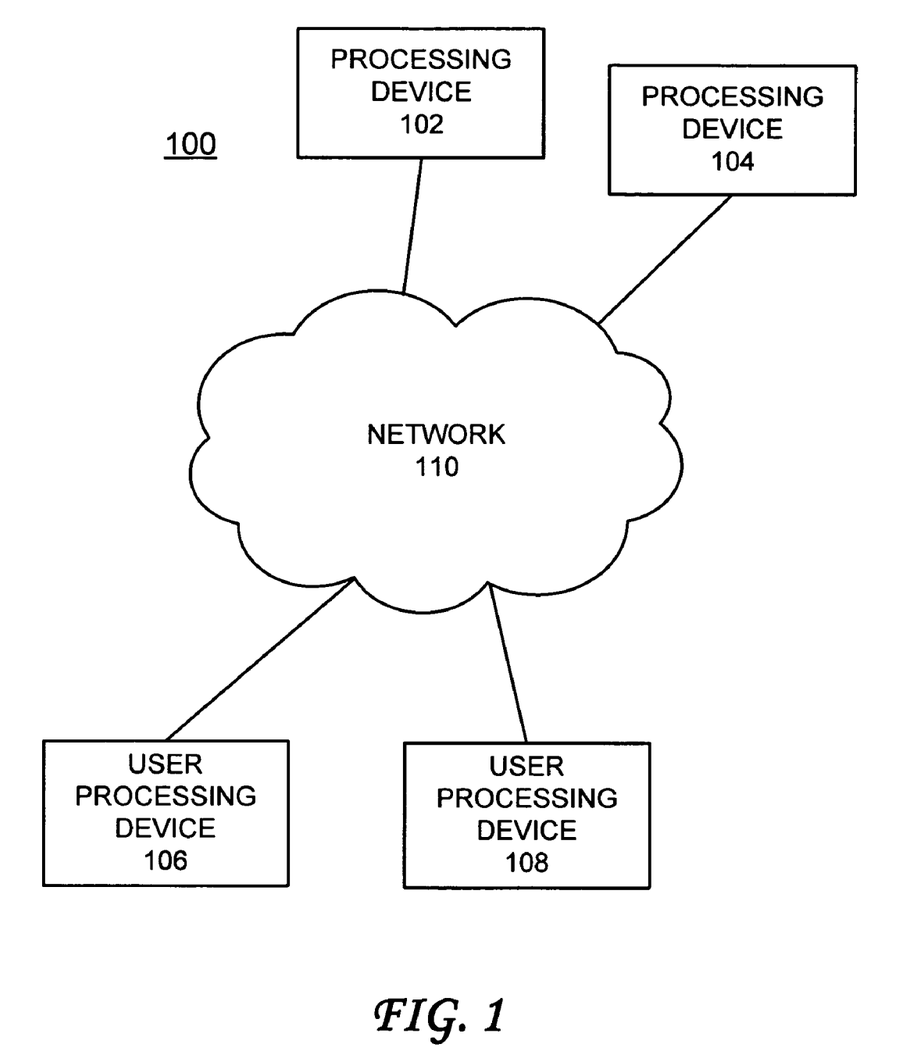
FIG. 1 illustrates an exemplary operating environment consistent with the subject matter of this disclosure.

FIG. 1 illustrates an exemplary operating environment 100 for an embodiment consistent with subject matter of this disclosure. Operating environment 100 may include processing devices 102 and 104, user processing devices 106 and 108, and network 110.

Processing devices 102 and 104 may be, for example, servers or other processing devices. In one embodiment, processing device 102 may be an e-commerce server for receiving and validating a payment for a purchase of a feature of a software product and processing device 104 may be a product activation server for storing information with respect to software products, features of the software products, and identifying information of processing devices, upon which the software products and features of the software products are installed and activated.

User processing devices 106 and 108 may be processing devices upon which a software product may be installed and features of the software product may be activated. Processing devices 106 and 108 may be handheld processing devices, desktop processing devices, such as, for example, personal computers (PCs), notebook processing devices, or other processing devices.

Network 110 may be a wired or wireless network and may include a number of devices connected via wired or wireless means. Network 104 may include only one network or a number of different networks, some of which may be networks of different types. Network 110 may include a packet-switching network, a wireless network, an ATM network, a Frame Relay network, an optical network, a Public Switched Telephone Network (PSTN), a satellite network, the Internet, or an intranet or other types of networks, or any combination of the above networks.

In implementations consistent with the subject matter of this disclosure, user processing devices 106 and 108 may communicate with processing devices 102 and 104 when a user of user processing device 106 or 108 purchases and activates a feature of a software product.

FIG. 1 illustrates an exemplary operating environment. Other operating environments or variations of operating environment 100 may be used with other embodiments consistent with the subject matter of this disclosure. For example, in one embodiment, functions or services performed by processing devices 102 and 104 may be distributed across additional processing devices, which may be connected via a network, such as, for example, network 110. In another embodiment, functions and services performed by processing devices 102 and 104 may be combined into a single processing device.

Exemplary Processing Device

Figure 2:
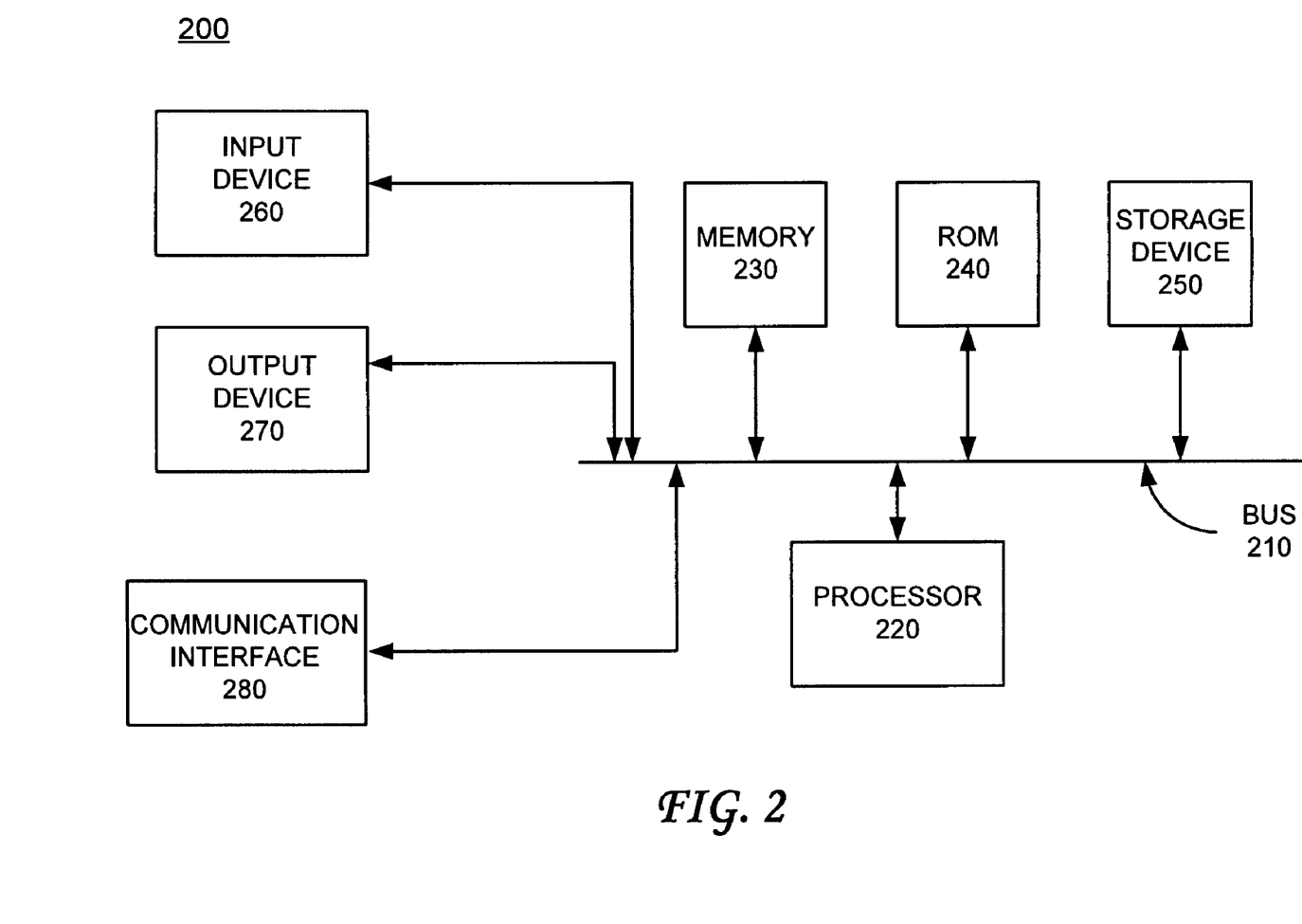
FIG. 2 is a functional block diagram illustrating an exemplary processing device, which may be used in implementations consistent with the subject matter of this disclosure.

FIG. 2 is a functional block diagram that illustrates an exemplary processing device 200, which may be used to implement processing devices 102, 104, 106, or 108. Processing device 200 may include a bus 210, a processor 220, a memory 230, a read only memory (ROM) 240, a storage device 250, an input device 260, an output device 270, and a communication interface 280. Bus 210 may permit communication among components of processing device 200.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media for storing data and/or instructions.

Input device 260 may include one or more conventional mechanisms that permit a user to input information to processing device 200, such as, for example, a keyboard, a mouse, or other input device. Output device 270 may include one or more conventional mechanisms that output information to the user, including a display, a printer, or other output device. Communication interface 280 may include any transceiver-like mechanism that enables processing device 200 to communicate with other devices or networks. In one embodiment, communication interface 280 may include an interface to network 110. The interface may be a wired or wireless interface.

Processing device 200 may perform such functions in response to processor 220 executing sequences of instructions contained in a tangible machine-readable medium, such as, for example, memory 230, or other medium. Such instructions may be read into memory 230 from another machine-readable medium, such as storage device 250, or from a separate device via communication interface 280.

Overview

A user may wish to purchase a feature of a software product installed on a processing device, such as, for example, a PC, or other processing device. For example, a feature of the software product may permit up to 10 users to connect to the user's PC simultaneously. However, a version of the software product, which is currently installed on the user's PC, may not have that feature activated, or enabled. Embodiments consistent with the subject matter of this disclosure, may permit the user to purchase the feature and activate, or enable the feature on the user's processing device. When the user activates the feature on the user's processing device, a processing device, such as, for example, a product activation server may be provided with information identifying the software product, the feature the software product, and the processing device upon which the feature the software product is to be activated. The product activation server may store the provided information in a database, thereby associating the processing device with the software product and the feature of the software product.

In one embodiment, the user may request a trial of a feature of a software product and have that feature temporarily enabled on the user's processing device for a predetermined time period. If the user is satisfied with the feature, the user may then purchase the feature and have the feature permanently activated, or enabled on the processing device.

At some point, the user may decide to have the feature activated, or enabled on a different processing device instead of the processing device that currently has the feature activated, or enabled. Embodiments consistent with the subject matter of this disclosure may permit the user to deactivate the feature of the software product on the processing device and may permit the user to activate the feature of the software product on the different processing device.

If the processing device upon which the feature is activated, or enabled, becomes unusable for one reason or another, embodiments consistent with the subject matter of this disclosure may permit the user, via a different processing device, to access a remote processing device, such as, for example, a product activation server, or other processing device, to disassociate the feature from the unusable processing device, such that the feature may be activated on another processing device.

Exemplary Processing

Purchasing a Feature

Figure 3:
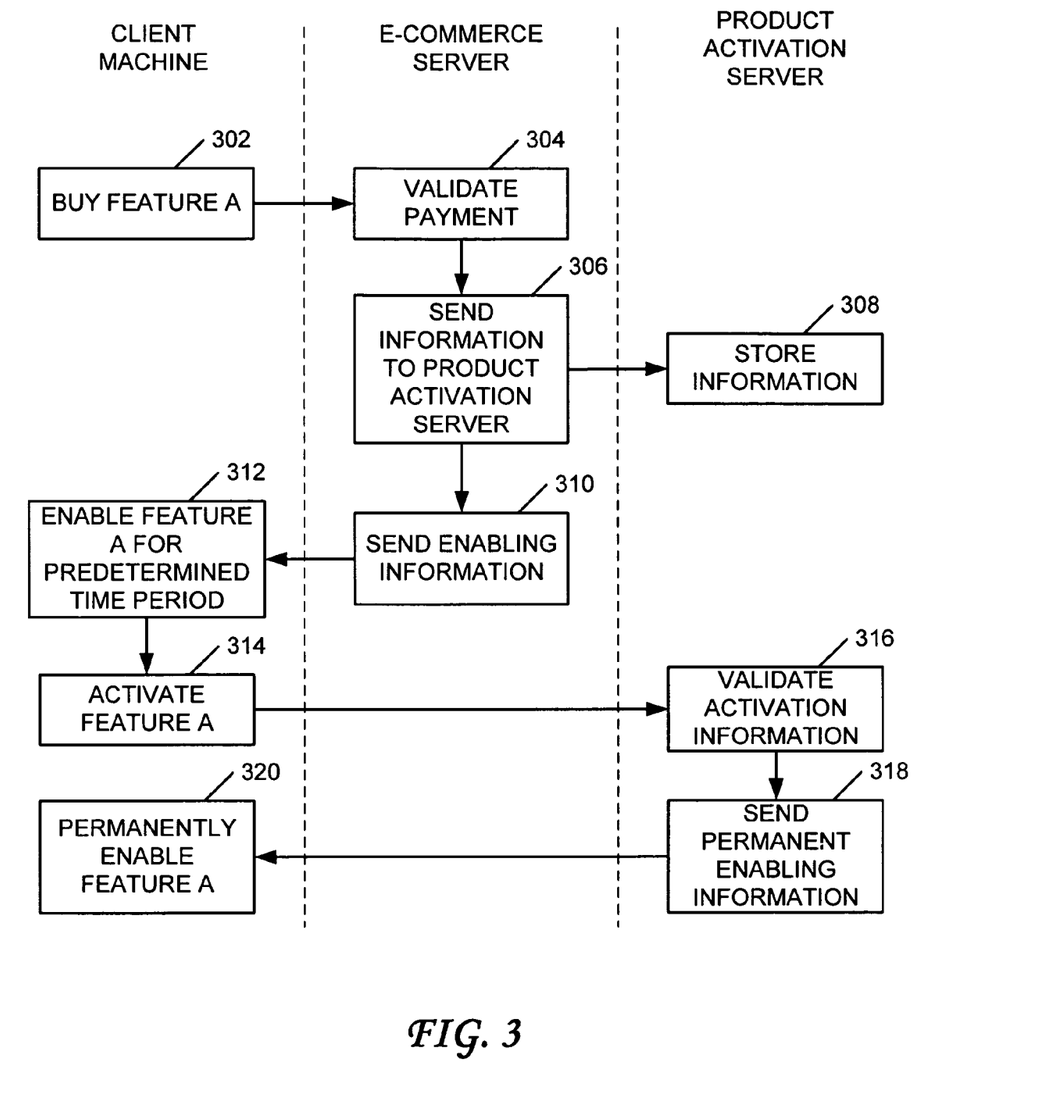
FIG. 3 is a flow diagram illustrating an exemplary process for purchasing a feature of a software product in an embodiment consistent with the subject matter of this disclosure.

FIG. 3 is a flow diagram illustrating an exemplary process in which a user of a client machine, such as, for example user processing device 106 or user processing device 108, may purchase a feature of a software product. After the user indicates an intent to purchase a feature, for example, feature "A" of a software product, the client machine may send a request to buy the feature "A" of the software product to an e-commerce server, or other processing device (act 302). The request may be sent as a result of the user selecting the feature from a menu of features, which may be displayed on a display screen of the client machine. In some embodiments, the user may attempt to use a feature of the software product that is either not enabled on the client machine or exceeds a limit of the feature enabled on the client machine (for example, exceeding a number of connections limit or other limit) and the software product may cause an icon or menu item to be presented to the user via the display screen of the client machine. For example, if a number of connections is limited to 10 on the client machine and all connections have been used, then information about a feature that permits more than 10 connections on the client machine may be displayed on the display screen. By selecting the icon or menu item, the client machine may send a request to buy the feature to the e-commerce server. In another embodiment, a user's commands or use patterns may be tracked and the user may be presented with information about features, which the user may purchase, that may benefit the user based on the tracked commands or the tracked use patterns.

The e-commerce server, or other processing device, may receive the purchase request and may validate payment (act 304). The purchase request may include purchase information, such as, for example, an account number or a credit card number and a purchaser's name, and may further include information identifying the software product, information identifying the feature the user wishes to purchase, and information identifying the client machine. In one embodiment, the information identifying the client machine may be a relatively unique identifier based on a number of characteristics of the client machine, such as, for example, a processor type, memory capacity, hard disk drive type and capacity, as well as other characteristics. In another embodiment, each client machine may be assigned a globally unique identifier, similar to an identifier assigned to network cards today. The e-commerce server may validate payment by any number of means, including but not limited to, accessing a credit card company's payment server, providing the credit card number and purchaser's name to the payment server, and receiving payment confirming information from the payment server.

The e-commerce server may then provide information to another processing device, such as, for example, a product activation server (act 306). The information provided to the product activation server may include information identifying the software product, information identifying the feature of the software product, and information identifying the client machine. The product activation server may then store the information in, for example, a database (act 308). When the product activation server stores information identifying the client machine along with the information identifying the software product and the feature of the software product, the client machine is being associated with the software product and the feature of the software product.

The e-commerce server may then send enabling information to the client machine (act 310). The enabling information may include information for enabling the feature of the software product on the client machine for a predetermined time period, such as, for example, 30 days or other predetermined time period. The client machine may receive the enabling information and may activate or enable the feature of the software product for the predetermined time (act 312).

At some point within the predetermined time period, the user of the client machine may cause an activation request for the feature of the software product to be sent to the product activation server (act 314). This may occur as a result of issuing an activation command for the feature while executing the software product on the client machine. Of course, in other embodiments, other methods may be used for issuing the activation request for the feature of the software product from the client machine. The product activation server may receive the activation request and may validate activation information (act 316). The activation information that may be included in the activation request may be information identifying the client machine, information identifying the software product, and information identifying the feature of the software product. The product activation server may validate the activation information by comparing the information identifying the client machine, the information identifying the software product, and the information identifying the feature of the software product with corresponding information stored by the product activation server during act 308. The product activation server may then send enabling information for permanently enabling the feature of the software product to the client machine (act 318). The client machine may then receive the enabling information and may permanently enable the feature of the software product (act 320).

The processing described with reference to FIG. 3 is exemplary. In other embodiments, more, fewer, or different acts may be performed to permit the user of the client machine to buy a feature of a software product. Further, in some embodiments, the feature of the software product may be included in the installed software product and may easily be activated or enabled. In other embodiments, the client machine may request that the feature of the software product be downloaded to the client machine from a server, such as the e-commerce server, or another server. In yet another embodiment, the feature may be delivered to the user in an off-line fashion, such as via a physical medium. Examples of the physical medium may include, but not be limited to, DVD, CD, flash RAM, floppy disk, or other medium.

Requesting a Trial Period of a Software Product Feature

Figure 4:
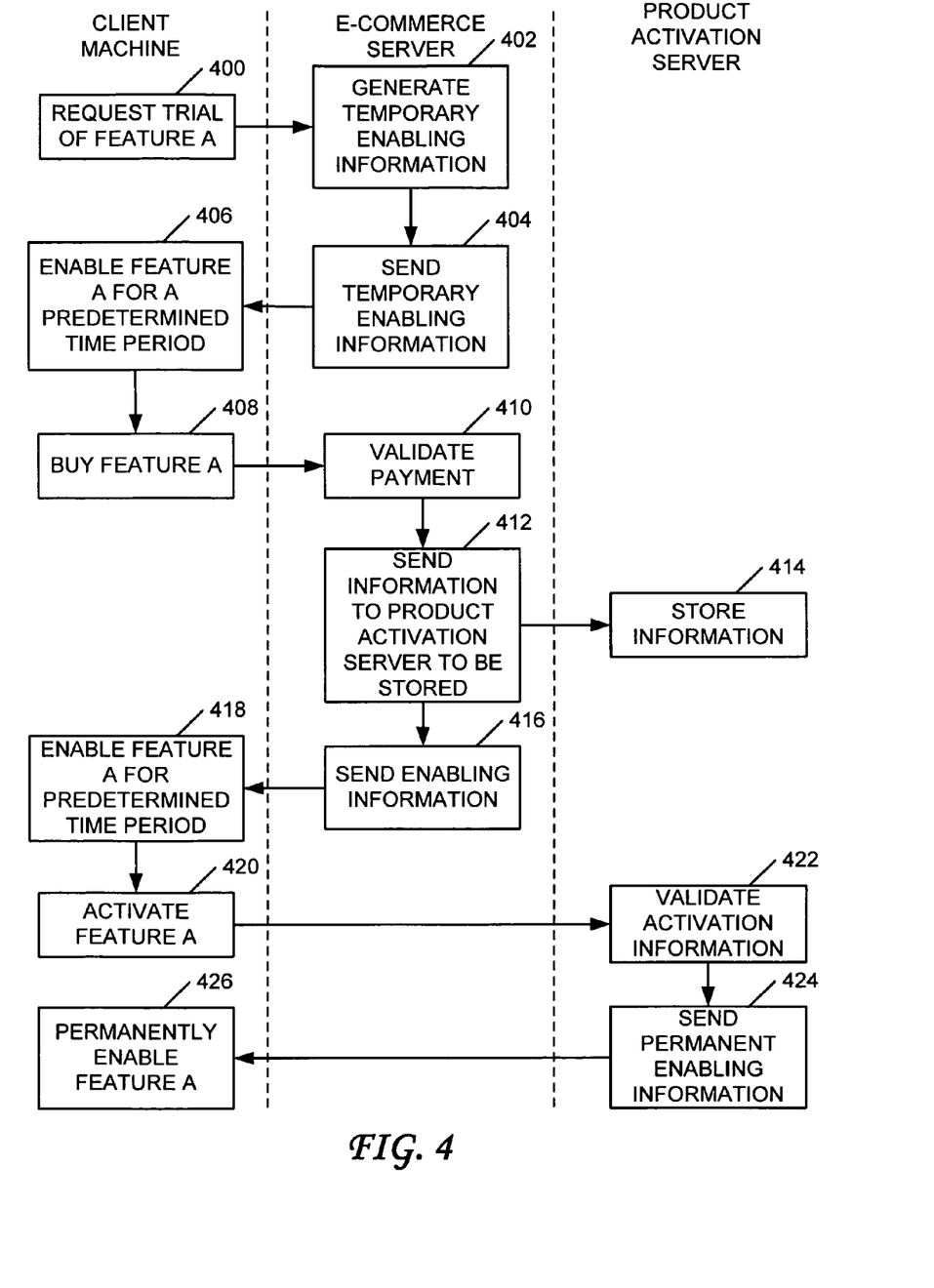
FIG. 4 is a flow diagram illustrating an exemplary process for requesting a trial period for using a feature of a software product before purchasing the feature of the software product.

FIG. 4 illustrates a flow diagram of an exemplary process, which may be implemented in embodiments consistent with the subject matter of this disclosure, for requesting and receiving a trial period for a software feature before purchasing the feature. The process may begin with the client machine transmitting a request for a trial period for a feature of the software product (act 400). In one embodiment, the client machine may transmit the request when the user of the client machine makes a selection from a menu, to select a feature for which a free trial may be requested. In other embodiments, while executing the software product, the user may be presented with an option of requesting a trial of a software feature based on how the software product is being used. For example, if the software product permits multiple connections to the processing device and the current number of connections is close to or has reached a maximum number of connections, the software product may present to the user, via a display, an option to request a feature which permits a higher maximum number of connections. Of course, in other embodiments a user of the client machine may request a trial of a feature of a software product via numerous other means.

A processing device, such as, for example, an e-commerce server, or other processing device, may receive the request for the trial. The request for the trial may include information identifying the software product, information identifying the feature of the software product, and information identifying the client machine. In response to receiving the request for the trial, the e-commerce server may generate temporary enabling information for enabling the feature of the software product for a predetermined time period, such as, for example, 30 days, or another time period (act 402). The e-commerce server may then send the temporary enabling information to the client machine (act 404). The client machine may receive the temporary enabling information from the e-commerce server and may enable the feature of the software product for the predetermined time period (act 406).

At some point later, the user of the client machine may indicate a desire to buy the feature of the software product. If the user does not purchase the feature within the predetermined time period, the feature may be disabled on the processing device. However, other features of the software product will continue to work as before. For example, as the trial period for using the feature nears an end of the predetermined time period, the software product executing on the client machine may display a message to the user reminding the user that the predetermined time period will be ending and asking the user whether he or she wishes to purchase the feature. In other embodiments, the user may indicate a desire to buy the feature of the software product via other means. The client machine may then send a purchase request to buy the feature of the software product to the e-commerce server (act 408). The purchase request may include purchase information, such as, for example, an account number or a credit card number and a purchaser's name, and may further include information identifying the software product, information identifying the feature the user wishes to purchase, and information identifying the client machine. In one embodiment, the information identifying the client machine may be a relatively unique identifier based on a number of characteristics of the client machine, such as, for example, a processor type, memory capacity, hard disk drive type and capacity, as well as other characteristics.

The e-commerce server may then validate payment for the feature of the software product (act 410). The e-commerce server may validate payment by any number of means, including but not limited to, accessing a credit card company's payment server, providing the credit card number and purchaser's name to the payment server, and receiving payment confirmation information from the payment server.

The e-commerce server may then provide information to another processing device, such as, for example, a product activation server (act 412). The information provided to the product activation server may include information identifying the software product, information identifying the feature of the software product, and information identifying the client machine. The product activation server may then store the information in, for example, a database (act 414). When the product activation server stores information identifying the client machine along with the information identifying the software product and the feature of the software product, the client machine is being associated with the software product and the feature of the software product.

The e-commerce server may then send enabling information to the client machine (act 416). The enabling information may include information for enabling the feature of the software product on the client machine for a predetermined time period, such as, for example, 30 days, or other predetermined time period. The client machine may receive the enabling information and may activate or enable the feature of the software product for the predetermined time (act 418).

At some point within the predetermined time period, the user of the client machine may cause an activation request for the feature of the software product to be sent to the product activation server (act 420). This may occur as a result of the user of the client machine issuing an activation command for the feature while executing the software product on the client machine. Of course, in other embodiments, other methods may be used for issuing the activation request for the feature of the software product from the client machine. The product activation server may receive the activation request and may validate activation information (act 422). The activation information that may be included in the activation request may be information identifying the client machine, information identifying the software product, and information identifying the feature of the software product. The product activation server may validate the activation information by comparing the information identifying the client machine, the information identifying the software product, and the information identifying the feature of the software product with corresponding information stored by the product activation server during act 414. The product activation server may then send enabling information for permanently enabling the feature of the software product to the client machine (act 424). The client machine may then receive the enabling information and may permanently enable the feature of the software product (act 426).

Deactivation of a Feature of a Software Product

Figure 5:
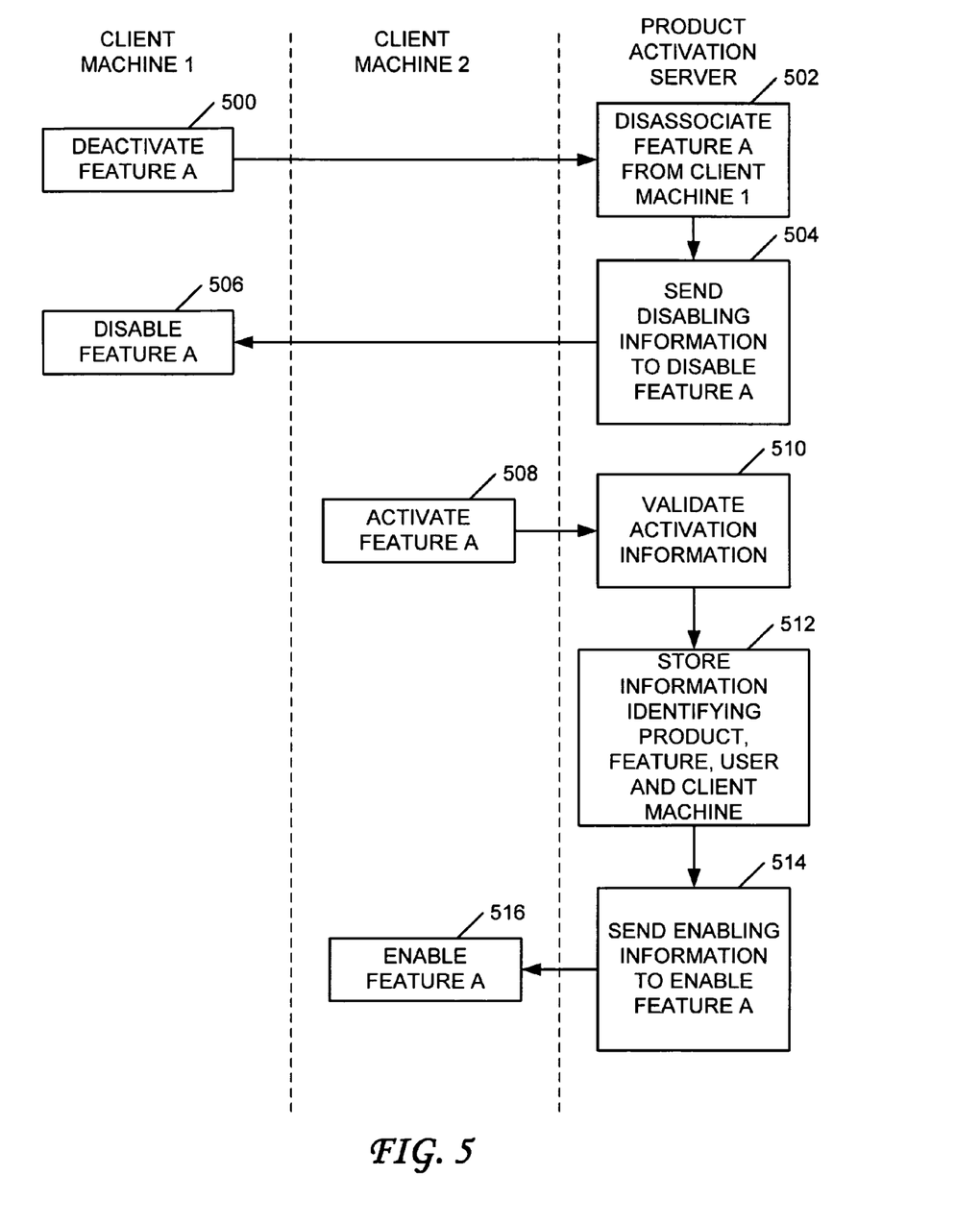
FIG. 5 is a flow diagram illustrating an exemplary process for deactivating a feature of a software product on one processing device and activating the feature of the software product on a second processing device.

At some point, the user of the client machine may decide that he or she would prefer to have a particular feature of a software product enabled on a different client machine, on which the software product is installed, instead of a current client machine on which the feature of the software product is enabled. FIG. 5 is a flow diagram illustrating an exemplary process for deactivating a feature of a software product on a client machine and activating the feature of the software product on a different client machine. In this exemplary embodiment, information identifying a user may be included with information sent to and stored by the product activation server during act 306 and 308 of FIG. 3, and acts 412 and 414 of FIG. 4. Storing information identifying the user with information identifying the software product and information identifying the feature of the software product associates the user with the feature of the software product. In some embodiments, information identifying the user may include account number information, credit card information, or other information that may identify the user.

The process may begin with client machine 1, which may be a processing device such as user processing device 106 or 108, sending a deactivation request to deactivate a feature of a software product installed on client machine 1 (act 500). The deactivation request may be issued as a result of a command selected from a menu displayed on client machine 1 while executing the software product. The deactivation request may include information identifying the user, information identifying the software product, information identifying the feature of the software product, and information identifying client machine 1. A processing device, such as, for example, a product activation server, or other server may receive the deactivation request and may disassociate the feature from client machine 1 (act 502) by finding an entry in storage, such as a database, corresponding to the data stored during act 308 (FIG. 3) or act 414 (FIG. 4) and deleting the information identifying the client machine. The deletion of the information identifying the client machine, in effect, disassociates the client machine from the feature of the software product. The product activation server may then send disabling or deactivating information to client machine 1 to disable the feature of the software product (act 504). Client machine 1 may receive the disabling information and may disable the feature of the software product, such that the feature may no longer operate on client machine 1 (act 506).

At some point after the feature of the software product has been disabled on client machine 1, the user may issue a command to activate the feature of the software product from a client machine 2, which may be a processing device such as user processing device 106 or 108, resulting in an activation request being sent from client machine 2 to the product activation server (act 508). The activation request may include information identifying the user, information identifying software product, information identifying the feature of the software product, and information identifying client machine 2. The product activation server may receive the activation request and may validate the activation request by comparing the information included in the activation request with information stored on the product activation server (act 510). In this example, the comparison of the information included in the activation request with information stored in the product activation server would indicate that the feature of the software product is not associated with client machine 2. However, the comparison would indicate that the user, identified by the information identifying the user in the activation request, has rights to use the feature of the software product because of a discovery of the feature being associated with the user, but not being associated with a processing device. The product activation server may then associate the feature of the software product with client machine 2 by storing information identifying client machine 2 with information identifying the software product, information identifying feature the software product, and information identifying the processing device upon which the feature and the software product are installed (act 512). The product activation server may then send enabling information to client machine 2 to enable the feature of the software product permanently (act 514). Client machine 2 may receive the enabling information from the product activation server and may permanently enable the feature of the software product (act 516).

Figure 6A:
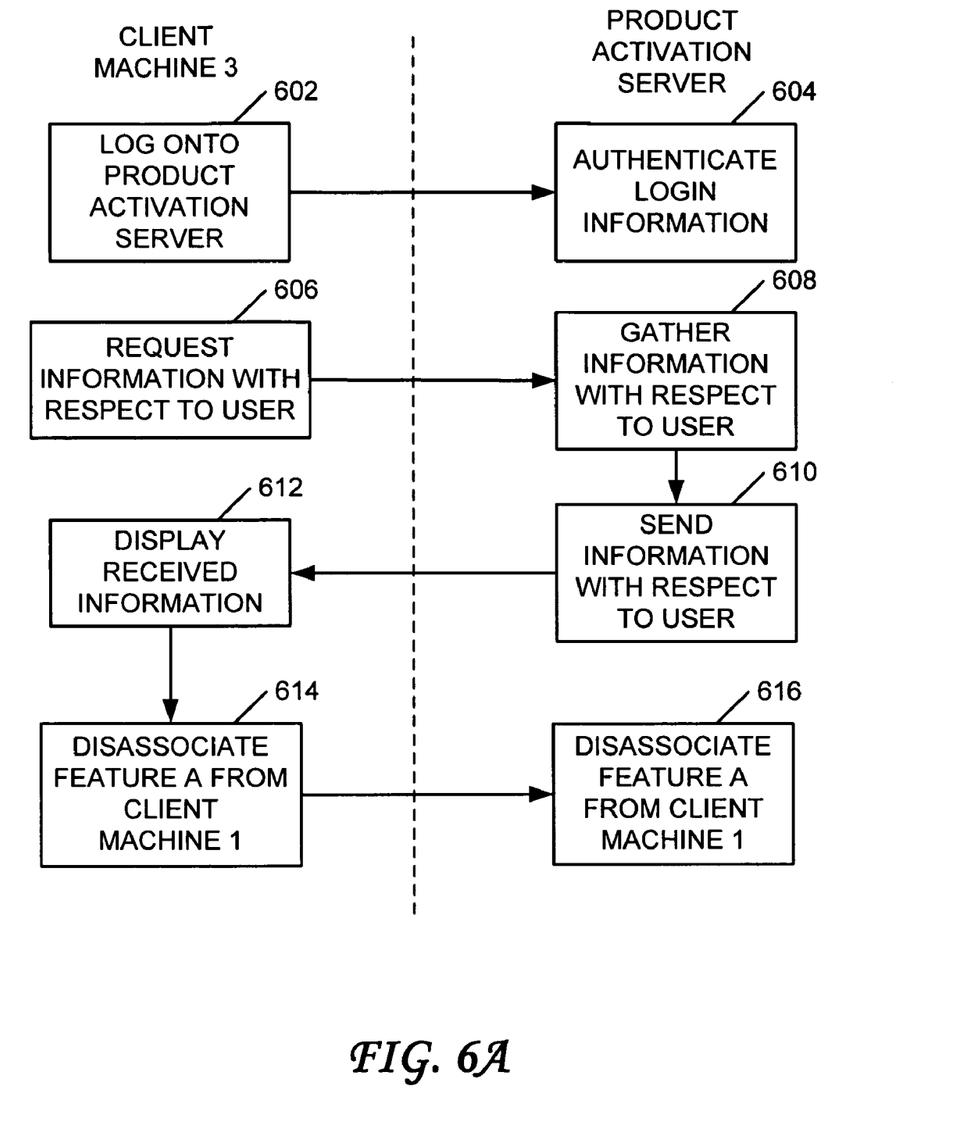
FIGS. 6A and 6B are flow diagrams illustrating an exemplary process for deactivating or disassociating a feature of a software product, enabled on a processing device, which may be unusable, and activating the feature of the software product on a second processing device.
Figure 6B:
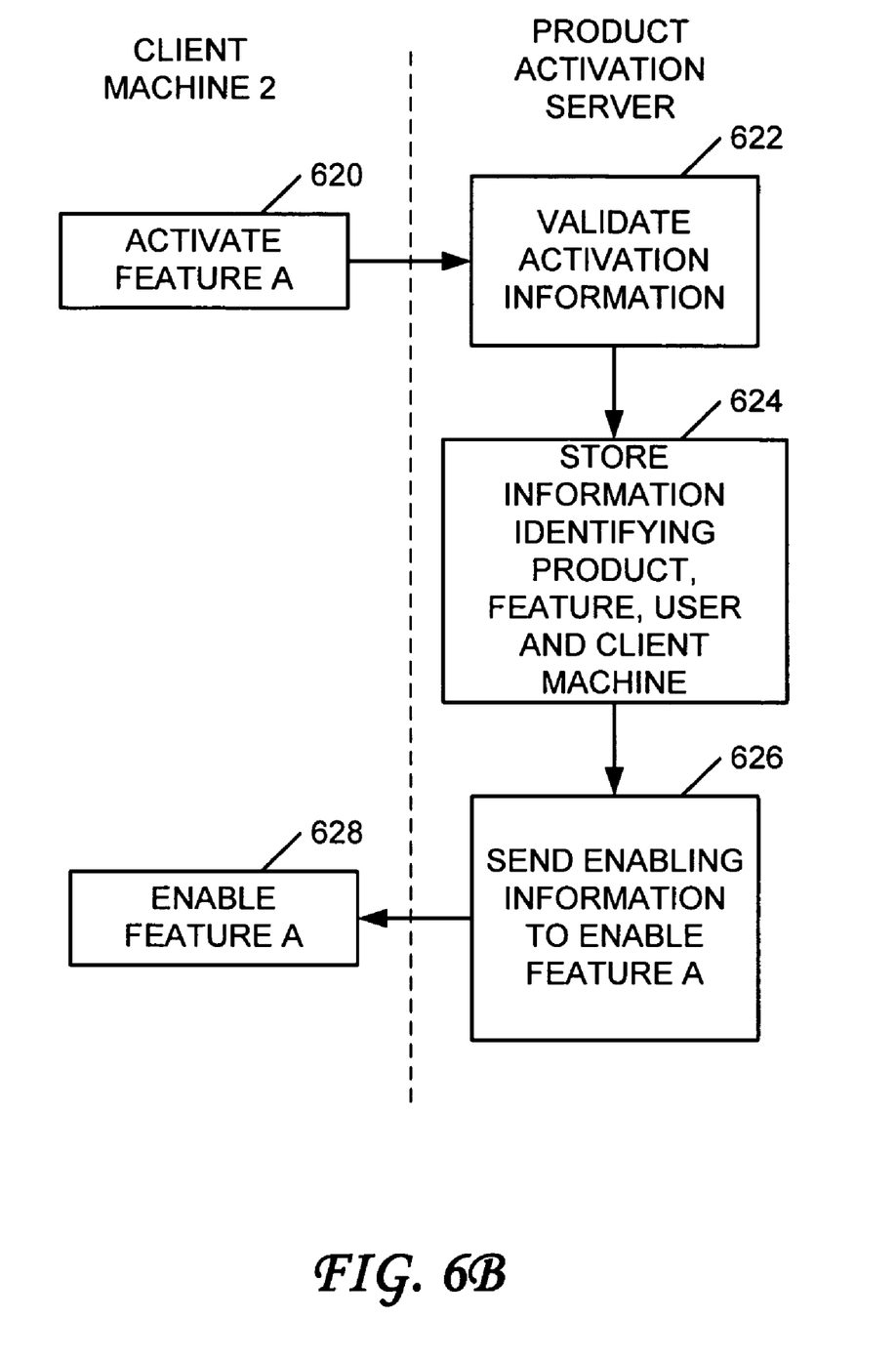

Disassociating a Feature of the Software Product from an Unusable Processing Device Embodiments consistent with the subject matter of this disclosure may permit a user to disassociate a software feature of a software product from an unusable processing device upon which the feature of the software product was activated or enabled. FIGS. 6A and 6B are flow diagrams which illustrate an exemplary process for disassociating a feature of a software product from one processing device and activating the feature of the software product on another processing device.

The process may begin with a user logging onto a processing device, such as, for example, a product activation server, or other processing device from client machine 3, which, in one embodiment, may be, for example, user processing device 106 or user processing device 108 (act 600). In one embodiment, the user may use client machine 3 to access another processing device, such as, for example, a product activation server, or other server via a network, such as, for example, network 110. When logging onto the product activation server, the user may enter login information, such as, for example, a unique user ID and a password. The product activation server may receive the login information from client machine 3 and may authenticate login information (act 602). The product activation server may perform authentication by comparing, for example, a received user ID/password with an authentication list of authorized user IDs and corresponding passwords (act 604). If authentication fails, the remainder of the process may not be performed.

Client machine 3 may then send a request for information with respect to the user (act 606). The request for information may include information identifying the user, which may be the user ID, account number information, credit card information, or other identifying information. The request for information with respect to the user may be received by the product activation server, causing the product activation server to gather information with respect to the user (act 608). The information may include identifying information of one or more processing devices associated with the user, identifying information of one or more software products associated with the user, and identification of one or more features of the software product associated with the user. The product activation server may then send the gathered information with respect to the user to client machine 3 (act 610). Client machine 3 may receive the gathered information and display the gathered information on a display screen of client machine 3 (act 612). The user of client machine 3 may view the displayed gathered information and may select a displayed feature of a software product for disassociation from a hardware item or processing device, such as client machine 1 or other processing device, resulting in a disassociation request being sent from client machine 3 to the product activation server (act 614). The user may select the displayed feature of the software product for disassociation by using a pointing device, such as a computer mouse, or other device, by using a keyboard, or by other input means. The disassociation request may include information identifying the user, information identifying the software product, information identifying the feature of the software product, and information identifying the processing device upon which the feature the software product is currently activated or enabled. The product activation server may receive the disassociation request and may disassociate the software feature from the processing device or hardware item (act 616), in this example, client machine 1, by finding an entry in storage, such as, for example, a database, indicating that the identified processing device (client machine 1), the identified user, the identified software product, and the identified feature of the software product are associated, and by deleting the information identifying the processing device.

Later, the user may issue an activation request, from a different processing device, such as, for example, client machine 2 or other processing device, by requesting activation of the software feature of the software product, thereby causing an activation request to be sent to the product activation server (act 620; FIG. 6B). The activation request may include information identifying the user, such as a user ID, an account number, a credit card number or other information, and may include information identifying a software product, information identifying the feature the software product, and information identifying the processing device, in this case client machine 2. The product activation server may receive the activation request and may validate the information included in activation request (act 622). The product activation server may validate the activation information included in the activation request by comparing the activation information with information stored on the product activation server. In this example, a result of the comparing would indicate that the software product and feature of the software product are associated with the user, but are not associated with a processing device. The product activation server may then store information identifying the processing device, in this case client machine 2, information identifying the product, information identifying the feature, and information identifying the user, such that client machine 2 is associated with the user, the software product, and the feature the software product (act 624). In some embodiments, the product activation server may also store information about an organization to which the user belongs. The product activation server may then send enabling information, to enable the feature of the software product, to client machine 2 (act 626). Client machine 2 may receive the enabling information and may permanently enable the feature of the software product (act 628).

The processing described with reference to FIGS. 6A and 6B is exemplary. In other embodiments more, fewer, or different acts may be performed to disassociate a feature of a software product from one processing device and to activate the feature the software product on another processing device. For example, in some embodiments, a particular user may be able to disassociate a processing device associated with the user only a predetermined number of times. Further, in some embodiments, the feature of the software product may be included in the installed software product, but disabled, and may easily be activated or enabled. In other embodiments, a processing device may request that the feature of the software product be downloaded. The feature may be downloaded from a server, such as an e-commerce server, or another server.

User IDs

FIGS. 6A and 6B provide an example in which a user of a processing device may request a report of information associated with the user. In some embodiments consistent with the subject matter of this disclosure, the user may be an entity, such as, for example, a corporation, or other entity, the user may be a subset of the entity, such as, for example, a group within a corporation, or other subset, or the user may be an individual. In other embodiments, more or fewer types of users may exist. For example, a user may be an entity, a subset of the entity, a subset of the subset of the entity, etc., as well as an individual.

Figure 7:
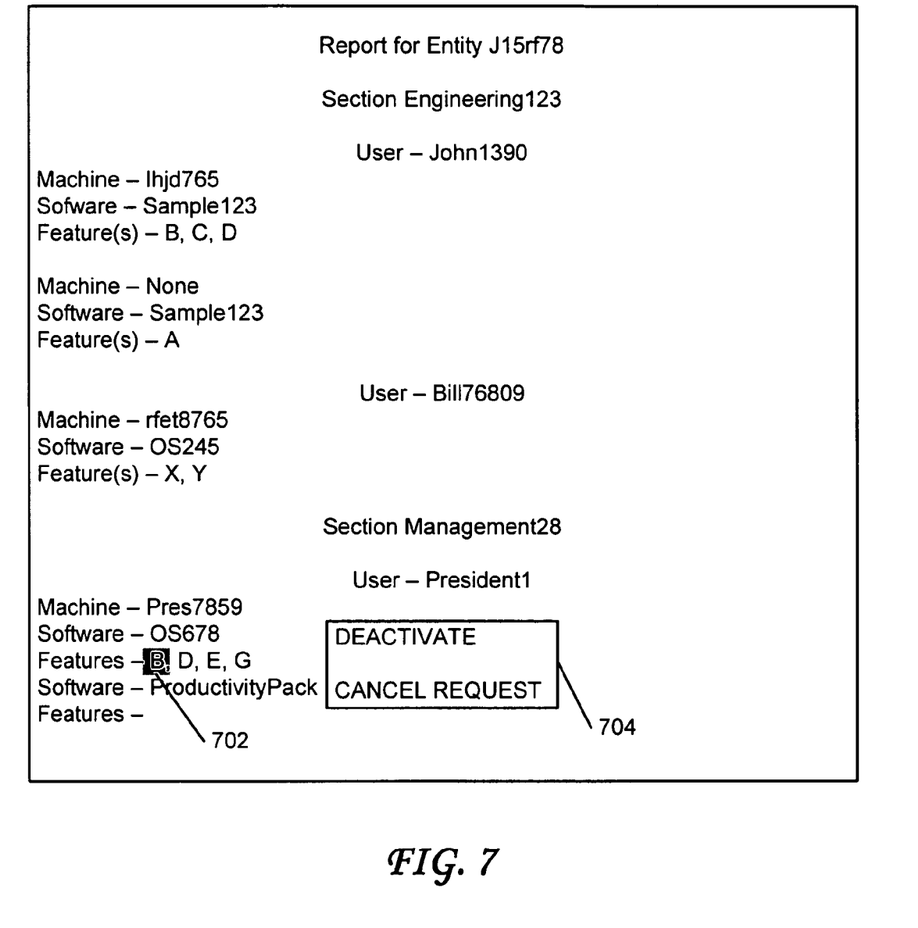
FIG. 7 illustrates an exemplary report that may provided to a processing device in response to requesting information associated with an entity.

FIG. 7 illustrates an exemplary report that may provided to a processing device in response to requesting information associated with a user, which is an entity. The report may include a name of the entity, such as, "J15rf78". In this example, the entity has two subsets," Section Engineering123" and "Section Management28". Subset "Section Engineering123" may include two individual users, " John1390" and "Bill76809". Individual user "John1390" has software product "Sample123" with features "B", "C" and "D" associated with processing device "Ihjd765", and has software product "Sample123" with feature "A" associated with no processing device. Individual user "Bill76809"has software product "OS245" with features "X" and "Y" associated with processing device "rfet8765". Subset "Section Management28" has one individual user, "President1", who has software product "OS678" with features "B", "D", "E", and "G" and software product "ProductivityPack" with no additional features associated with processing device "Pres7859".

In an embodiment consistent with the subject matter of this disclosure, a user may select one or more features of software products from a displayed report for a deactivation. The user may select the one or more features by using a pointing device, such as, for example, a computer mouse, or other input device to select the one or more features. The selected one or more features may be displayed with a visual indication 702, such as highlighting, blinking, or other visual indication to confirm selection of the software feature. After selection of the one or more software features, a menu 704 may be displayed. Menu 704 may include selections, such as, for example, "Deactivate" and "Cancel Request". Selection of "Deactivate" may result in a deactivation request being sent to a processing device, such as a product activation server or other processing device, as described previously. In other embodiments, different or other selection items may be available from a menu after selecting one or more software features.

When a user requests information with respect to the user, the information provided to the user may pertain only to the user. For example, an individual user requesting information with respect to a user may only be presented with information regarding that individual user. An entity user requesting information may only be presented with information regarding that entity user, which may include all subsection users and individual users associated with the entity user.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

The invention claimed is:

1. A method for providing features of a software product for purchase on a feature-by-feature basis, the method comprising:

receiving, by a second processing device via a network, a purchase request from a first processing device for adding a feature associated with a software product installed on the first processing device, the purchase request including identifying information, the identifying information including information identifying the software product, information identifying the feature associated with the software product, information identifying the first processing device, and information identifying a user; and;

validating, at the second processing device, a payment for the feature associated with the software product;

storing, by a product activation processing device, the identifying information;

sending first enabling information to the first processing device to enable the feature associated with the software product;

receiving, from the first processing device, a deactivation request with respect to the feature associated with the software product, the deactivation request including the information identifying the user, the information identifying the software product, the information identifying the feature associated with the software product, and the information identifying the first processing device;

disassociating the stored information identifying the first processing device from the stored identifying information in response to the receiving a deactivation request with respect to the feature associated with the software product;

receiving an activation request from a third processing device to activate the feature associated with the software product, the activation request including the information identifying the user, the information identifying the software product, the information identifying the feature associated with the software product, and information identifying the third processing device;

causing the information identifying the third processing device to be stored and to associate the information identifying the third processing device with the feature associated with the software product; and sending second enabling information to the third processing device to enable the feature associated with the software product.

2. The method of claim 1, wherein the first enabling information sent to the first processing device is for enabling the feature associated with the software product for a predetermined time period, the method further comprising:

receiving a request from the first processing device to activate the feature associated with the software product; and sending permanently enabling information to the first processing device to permanently enable the feature associated with the software product.

3. The method of claim 1, further comprising:

receiving, by the second processing device from the first processing device, a request for a free trial period for the software feature associated with the software product;

sending, by the second processing device, temporary enabling information to the first processing device to temporarily enable the feature associated with the software product for a predetermined time period, wherein:

the receiving a request for a free trial period for the software feature associated with the software product, and the sending temporary enabling information to the first processing device to temporarily enable the feature associated with the software product for a predetermined time period are performed before the receiving, by a second processing device via a network, a purchase request from a first processing device for a feature associated with a software product installed on the first processing device.

4. The method of claim 1, further comprising:

receiving, by the second processing device from the first processing device, a request for a free trial period for the software feature associated with the software product, the received request having been sent by the first processing device in response to a user requesting the software feature when presented with information about the software feature while using the software product;

sending, by the second processing device, temporary enabling information to the first processing device to temporarily enable the feature associated with the software product for a predetermined time period, wherein:

the receiving a request for a free trial period for the software feature associated with the software product, and the sending temporary enabling information to the first processing device to temporarily enable the feature associated with the software product for a predetermined time period are performed before the receiving, by a second processing device via a network, a purchase request from a first processing device for a feature associated with a software product installed on the first processing device.

5. The method of claim 1, wherein:
the user is an entity, a subset of an entity, or an individual.

6. The method of claim 1, wherein:
the user is an entity, a subset of an entity, or an individual, and
the method further comprises:
receiving a request for information with respect to the user, the requested information with respect to the user including the information identifying the software product, the information identifying the feature associated with the software product, and information identifying a processing device associated with the user;

providing the information with respect to the user;

receiving a request to disassociate a hardware item associated with the user from the feature of the software product;

disassociating the hardware item associated with the user from the feature of the software product in response to receiving the request to disassociate the hardware item;

receiving a request to activate the feature of the software product with respect to a different hardware item associated with the user;

associating the different hardware item associated with the user with the feature of the software product in response to receiving a request to activate the feature of the software product with respect to the different hardware item associated with the user; and sending third enabling information to the different hardware item associated with the user to enable the feature associated with the software product.

7. A system for enabling features associated with software products, via a network, the system comprising:

at least one server, the at least one server including at least one processor, and at least one memory communicatively connected to the at least one processor, the at least one memory comprising instructions for the at least one processor, the at least one memory comprising:

instructions for receiving a request for enabling an additional feature of a software product installed on a first processing device, the request including identifying information and information identifying a user of the first processing device, the identifying information further including information identifying the software product, information identifying the feature of the software product, and information identifying the first processing device;

instructions for storing the identifying information in a database and associating the additional feature of the software product with the first processing device, the instructions for storing the identifying information in a database and associating the additional feature of the software product with the first processing device further including instructions for storing the information identifying the user of the first processing device and associating the additional feature of the software product with the user;

instructions for sending first enabling information to the first processing device to enable the additional feature of the software product;

instructions for receiving, from a remote processing device via the network, a request for information with respect to at least one software product, and at least one feature of the at least one software product associated with the user, the request for information including the information identifying the user;

instructions for providing, to the remote processing device via the network, the information with respect to the at least one software product, and the at least one feature of the at least one software product associated with the user; and instructions for disassociating one of the at least one feature of one of the at least one software product from a processing device in response to receiving a disassociation request from the remote processing device.

8. The system of claim 7, wherein:
the instructions for receiving a request for enabling an additional feature of a software product installed on a first processing device further include instructions for receiving a purchase request for purchasing the additional feature of the software product, and
the at least one memory further comprises instructions for validating a payment for the additional feature of the software product.

9. The system of claim 7, wherein the at least one memory further comprises:
instructions for authenticating the user, and
the instructions for disassociating one of the at least one feature of one of the at least one software product from being permitted to execute only when the instructions for authenticating the user successfully authenticate the user.

10. The system of claim 7, wherein
the instructions for disassociating one of the at least one feature of the one of the at least one software product being permitted to execute only a predetermined number of times with respect to the user.

11. At least one machine-readable memory having instructions recorded therein for at least one processor, such that when the instructions are executed, the at least one processor performs a method comprising:
receiving a request for enabling an additional feature of a software product installed on a first processing device, the request including identifying information and information identifying a user of the first processing device, the identifying information further including information identifying the software product, information identifying the feature of the software product, and information identifying the first processing device, the information identifying the first processing device including a first identifier based on a number of characteristics of the first processing device;
storing the identifying information and the information identifying a user of the first processing device in a database and associating the additional feature of the software product with the first processing device and with the user;
sending first enabling information to the first processing device to enable the additional feature of the software product for a predetermined time period;
receiving, from the first processing device, an activation request for the additional feature associated with the software product, the activation request including the identifying information;
validating the received activation request based on comparing the identifying information included in the activation request with the identifying information previously stored in the database;
sending second enabling information to the first processing device, after performing the validating the received activation request, to enable the additional feature associated with the software product;
receiving, from a remote processing device via a network, a request for information with respect to the software product and at least one feature of the software product associated with the user, the request for information including the information identifying the user;
providing, to the remote processing device via the network, the information with respect to the software product and the at least one feature of the software product associated with the user;
authenticating the user; and
disassociating the at least one feature of the software product from a processing device in response to receiving a disassociation request from the remote processing device, the disassociating the at least one feature of the software product being performed only when the authenticating the user successfully authenticates the user.

12. The at least one machine-readable memory of claim 11, wherein the method further comprises:
receiving, from a second processing device after performing the disassociating the at least one feature of the software product from a processing device, a second request from a second processing device for enabling the at least one feature of the software product, the second request including second identifying information, the second identifying information further including the information identifying the software product, information identifying one of the at least one feature of the software product, and information identifying the second processing device;
validating the second identifying information included in the second request; and
sending third enabling information to the second processing device, after performing the validating the second identifying information included in the second request, to enable the at least one feature associated with the software product.

13. The at least one machine-readable memory of claim 12, wherein:
the sending third enabling information to the second processing device is performed after the validating the second identifying information included in the second request determines that the at least one feature of the software product and the software product are associated with the user, but are not associated with a processing device.

14. The at least one machine-readable memory of claim 12, further comprising:
storing the second identifying information after the validating the second identifying information included in the second request determines that the at least one feature of the software product and the software product are associated with the user, but are not associated with a processing device.

* * * * *